(12) United States Patent
Hibinger

(10) Patent No.: US 11,517,979 B2
(45) Date of Patent: Dec. 6, 2022

(54) METHOD FOR PRODUCING CORRUGATED CARDBOARD BLANKS, AND DEVICE

(71) Applicant: Panther Packaging GmbH & Co. KG, Tornesch (DE)

(72) Inventor: Frank Hibinger, Tornesch (DE)

(73) Assignee: Panther Packaging GmbH & Co. KG, Tornesch (DE)

( * ) Notice: Subject to any disclaimer, the term of this patent is extended or adjusted under 35 U.S.C. 154(b) by 594 days.

(21) Appl. No.: 16/483,331

(22) PCT Filed: Feb. 9, 2018

(86) PCT No.: PCT/EP2018/053271
§ 371 (c)(1),
(2) Date: Aug. 2, 2019

(87) PCT Pub. No.: WO2018/146248
PCT Pub. Date: Aug. 16, 2018

(65) Prior Publication Data
US 2020/0009684 A1   Jan. 9, 2020

(30) Foreign Application Priority Data
Feb. 13, 2017   (EP) ..................... 17155919

(51) Int. Cl.
*B23K 26/08*   (2014.01)
*B23K 26/142*   (2014.01)
(Continued)

(52) U.S. Cl.
CPC ........ *B23K 26/0838* (2013.01); *B23K 26/142* (2015.10); *B23K 26/38* (2013.01);
(Continued)

(58) Field of Classification Search
CPC .. B23K 26/38; B23K 2103/40; B23K 26/082; B23K 26/0838; B23K 2103/42;
(Continued)

(56) References Cited

U.S. PATENT DOCUMENTS 4,160,894 A   7/1979   Stemmler
4,545,780 A   10/1985  Martin
(Continued)

FOREIGN PATENT DOCUMENTS

DE   102010014430   6/2011
DE   102011103979   12/2012
(Continued)

OTHER PUBLICATIONS

International Search Report issued in International Application No. PCT/EP2018/053271 (5 pages).

*Primary Examiner* — Tu B Hoang
*Assistant Examiner* — Vy T Nguyen
(74) *Attorney, Agent, or Firm* — Beem Patent Law Firm

(57) ABSTRACT

The invention relates to a method for producing blanks from paper, cardboard, paperboard, corrugated cardboard, or plastic. The method according to the invention does not process panels or sheets into blanks in a multistage process but rather produces the blanks directly from the material web i.e. the corrugated cardboard web or from the paper, paperboard, plastic or cardboard web. The machining process is scalable. Advantageously, the method according to the invention can be adjusted in terms of the required production or packaging quantity by the juxtaposition of additional processing centers in terms of production speed and quantity.

5 Claims, 3 Drawing Sheets

(51) Int. Cl.
  *B23K 103/00* (2006.01)
  *B23K 26/38* (2014.01)
(52) U.S. Cl.
  CPC ...... *B23K 2103/40* (2018.08); *B23K 2103/42* (2018.08); *B65H 2301/51536* (2013.01)
(58) Field of Classification Search
  CPC .............. B23K 2203/40; B23K 26/0006; B23K 26/06; B23K 26/064; B23K 26/0643; B23K 26/0648; B23K 26/0652; B23K 26/0665; B23K 26/08; B23K 26/0846; B23K 26/142; B23K 26/382; B23K 2103/50; B23K 26/0057; B23K 26/402; B23K 26/53; B31F 1/2822; B31F 1/08; B31F 1/10; B31B 50/16; B31B 50/88; B31B 1/16; B31B 1/20; B31B 1/74; B31B 2201/0235; B31B 2201/14; B31B 2201/145; B31B 2201/88; B31B 2201/927; B31B 2201/94; B31B 2201/95; B31B 2219/145; B31B 2219/148; B31B 50/00; B31B 50/005; B31B 50/14; B31B 50/252; B31B 50/254; B31B 50/256; B31B 70/148; B31B 70/16; B65H 2301/51536; B65H 7/00; B26F 3/16; B42D 15/04; H01L 2251/5315; H01L 27/3276; H01L 51/5212; Y10T 83/4529
  USPC ........... 219/121.67, 121.79; 493/11, 29, 325, 493/340, 341, 464, 55, 59, 74, 17, 467; 700/218; 198/689

See application file for complete search history.

(56) References Cited

U.S. PATENT DOCUMENTS

| | | |
|---|---|---|
| 2005/0209075 A1 | 9/2005 | Kocherga |
| 2007/0193910 A1* | 8/2007 | Ernst ...................... D21F 9/006 206/459.1 |
| 2013/0017940 A1 | 1/2013 | Bonariva |
| 2015/0148940 A1* | 5/2015 | Ben-David .......... B31B 50/022 198/689.1 |
| 2019/0054644 A1* | 2/2019 | Hansen ................. B26F 1/3813 |

FOREIGN PATENT DOCUMENTS

| | | |
|---|---|---|
| EP | 1184127 | 3/2002 |
| EP | 2754526 | 7/2014 |
| JP | H02221034 | 9/1990 |
| JP | 2001162696 | 6/2001 |
| JP | 2002347139 | 12/2002 |
| JP | 2008012778 | 1/2008 |
| JP | 2014226833 | 12/2014 |
| RU | 2556186 C2 | 8/2012 |
| RU | 2594921 C2 | 10/2012 |
| RU | 2575521 C2 | 2/2016 |
| WO | 2013164810 A1 | 5/2012 |
| WO | 2014119439 | 1/2017 |
| WO | 2017001301 | 1/2017 |
| WO | 2017001301 A1 | 1/2017 |

\* cited by examiner

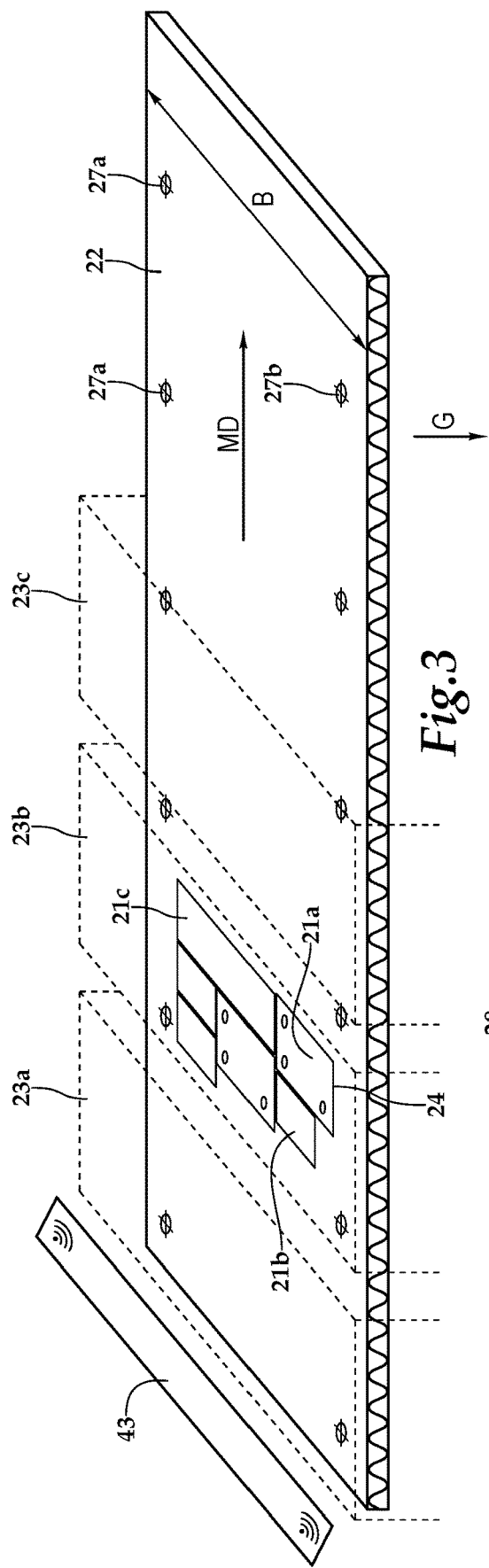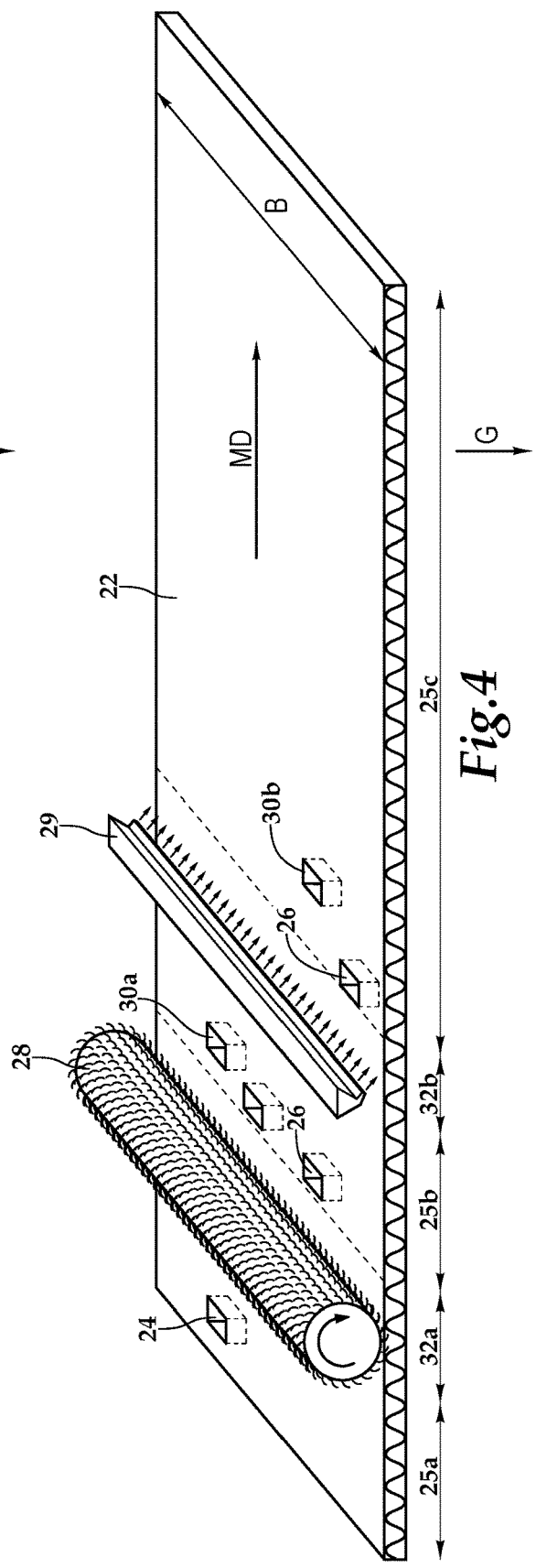

METHOD FOR PRODUCING CORRUGATED CARDBOARD BLANKS, AND DEVICE

CROSS-REFERENCE TO RELATED APPLICATIONS

This application claims benefit of PCT/EP2018/053271 filed Feb. 9, 2018, which claims benefit of European Patent Application No. 17155919.8, filed Feb. 13, 2017, both of which are incorporated by reference in its entirety.

FIELD OF THE INVENTION

The invention relates to a method for the production of blanks from corrugated cardboard. Furthermore, the subject of the invention is a device for the production of blanks from corrugated cardboard.

BACKGROUND OF THE INVENTION

For the global merchandise trade, packagings in various sizes and formats and made of different materials are needed. The packagings are usually made from blanks of paper, cardboard, paperboard, corrugated cardboard, or plastic. For example, paper envelopes, shipping boxes, or shipping packagings made of corrugated cardboard or cardboard, or plastic boxes are used. Additionally, there is a need for displays or stands for the presentation and promotion of goods. Displays or stands are also made from blanks made of paper, cardboard, paperboard, corrugated cardboard or plastic.

The manufacture of the packagings conventionally takes place so that firstly an endless material web e.g. a corrugated cardboard web or cardboard roll, is produced, and, at the end of the production method, panels or sheets are cut. These panels or sheets are stacked. The stack is transported after a certain number of pieces is reached or when switching to a different sheet format or different printing.

For corrugated cardboard blanks for packagings or displays, corrugated cardboard panels are produced from multiple paper webs using starch glue, steam and other auxiliaries on a corrugated cardboard production line (WPA). These corrugated cardboard panels are conveyed out in the form of stacks from the corrugator and must be stored for further processing until no more dimensional changes to the surface area of the corrugated cardboard panels occur. This dimensional stability is achieved when the corrugated cardboard panels have reached the equilibrium moisture content with the ambient air and the corrugated cardboard panels have cooled to the ambient temperature. In one or more downstream processes, the corrugated cardboard panels are optionally printed, stamped, scored, glued and processed to produce packagings.

FIG. 1 shows a device including a wet section A and a dryer section B for producing corrugated cardboard according to the prior art (source: Verband der Wellpappe-Industrie e.V.). The corrugated cardboard raw papers are transported as paper rolls to the device and are suspended in the holders of the roll-out stands 1. The roll-out stands 1 are equipped with brakes so that the papers can run under sufficient tension into subsequent machinery assemblies.

For the production of an endless corrugated cardboard web, two roll-out stands are connected to a splicer 2. As soon as the end of a paper roll of paper on a roll-out stand 1 is reached, the splicer 2 serves to connect the end of the paper roll to the beginning of a new paper roll by means of a double-sided adhesive tape.

The paper first passes through a preheating and moistening device 3, 4. In the corrugating assembly 5, the corrugated paper is guided through two heated corrugating rollers that interengage in the manner of toothed wheels and imprint the desired form of corrugation into the paper. The corrugated paper is guided between the corrugating rollers until the corrugated paper is fixed by bonding to the cover sheet. For this purpose, the glue applicator spreads starch glue onto the tops of the corrugations using an applicator roller. The corrugated paper and cover paper are combined in the corrugating assembly and heated further, so that the starch glue gels and thus ensures a firm connection between the corrugated paper and cover paper.

The upper transport means 6 conveys the single-sided corrugated cardboard onto the bridge 7, which serves as a web storage and thus can compensate for different speeds between the individual assemblies. Since the single-sided corrugated cardboard is still limp, it can be stored in the form of loops on the bridge 7, to increase the web storage on the shortest possible section of the apparatus.

In the bonding machine 9, the single-sided corrugated cardboard, which is delivered via the bridge 7 of the single-sided corrugator, is bonded to a second cover sheet with the aid of starch glue to produce single-corrugation corrugated cardboard, both the cover paper and the single-sided corrugated cardboard web being guided over the preheating cylinder 8 and are thereby heated to just below the gelling point of the starch glue used.

In the heating and traction section 10, the corrugated cardboard web slides overheated steel plates. Here, the necessary heat is supplied to the splices and the paper. At the same time the excess moisture is removed, so that the adhesive gels. The operation then continues to short cross cutter 11. Thereafter, a belt system conveys the corrugated cardboard to the scoring and cutting assembly 12.

In the scoring and cutting assembly 12, rotating blades divide the still endless corrugated cardboard web in the direction of travel into a plurality of webs in the machine direction. In addition to the blades, running scoring elements provide the corrugated cardboard with scorings, which later allow the bending when the packaging is set up. Since the corrugation is transverse to the corrugated cardboard web, cuts and scorings run perpendicular to the corrugation.

In a second cutting operation, the rotating cross cutter 13 divides the individual webs transversely to the machine direction. This creates the final sheet size. After the cross cutting, the finished corrugated cardboard blanks pile up like scales on one or more shelves 14. There, the cut sheets are fully automatically formed into corrugated cardboard stacks.

For cardboard blanks, e.g. for packagings, the blank is also produced from a sheet or a panel. After the paper or cardboard web has been rolled up on the paper or cardboard machine into a master roll (reel), in a downstream process, the paper or cardboard roll is cut by means of a cross cutter into sheets which are stacked one above the other. If necessary, these stacks are then printed, stamped, scored, glued and processed into packagings in one or more downstream processes.

There is a problem, when continuously transporting the panels or sheets away, particularly when small amounts of a sheet size are produced for a particular individual blank format. For example, if only 10 packagings of one size are to be produced, this represents a significant problem, to transport exactly these 10 panels away quickly enough, so that the production plant, e.g. the corrugator, does not have to be stopped or the production speed thereof drastically reduced. Particularly in the production of corrugated cardboard, due to the continuous corrugated cardboard production, the transport speed of the material web must be extremely high. The transportation of the stacked 1o sheets of one format and one size must be adapted corresponding to the transport speed of the corrugated cardboard web or cardboard or paper web. Similarly, the transport of very small stacks causes a significant logistical effort, since the stacks should not be mixed together and thus cause a large area of storage space to be required.

A further problem is that the choice of shapes that can be stamped out is restricted by the shape of the panels or sheets. Even with optimal arrangement of the blanks on the panel, therefore, pieces of waste are produced. Some blanks, which would be attractive for stability or structural reasons, cannot be produced economically due to the nonoptimal arrangement options on the panel. The stamping tools by which the blank is cut out of the panel are also comparatively expensive, since a stamping tool costs about 1,000.00 EUR. A fast and simple variation of the stamping shape is therefore not possible.

WO 2013/164810 describes a dynamic multiscanner system, which is used in the production of various packagings made of cardboard, paperboard, corrugated cardboard, or plastic. Here, sheets of the appropriate material are cut with laser cutters. The shapes on the sheets are correspondingly more freely selectable and easier to switch. The shape of the blank is dictated by a stamping roller from which the laser reads the shape to be cut out. This method allows a faster and more flexible processing of the sheets, but is tied to a sufficiently fast transport and removal of the sheets to be processed.

A method for the production of single- or multi-ply corrugated cardboard is known from DE 10 2008 062 964 A1. In the method, sheets are initially produced conventionally. Since laminating, trimming and scoring are carried out in one operation, the production times for the blanks are shortened.

The object of the invention is to provide a method for the production of blanks from corrugated cardboard, by which the disadvantages described above are overcome, and in particular to provide a production of blanks from corrugated cardboard which is faster, more cost-effective and more flexible in terms of the shape of the blank produced. Furthermore, the method should be able to produce blanks economically, ranging from an individual copy, i.e., number of pieces 1, up to mass production.

The object is achieved according to the invention by a method according to claim 1.

Further embodiments are the subject matter of the sub-claims or are described below.

SUMMARY

In one embodiment, the method according to the invention for the production of blanks from corrugated cardboard is carried out continuously from the material web. In this case "continuous" is understood in method terms to mean that a continuous supply of material takes place and blanks are produced without dropping or stacking.

The method according to the invention comprises the steps of:
  if necessary, providing a material made of corrugated cardboard, i.e. a corrugated cardboard web,
  guiding the material web into the area of action of at least one first cutting tool or a first group of cutting tools,
  cutting the material web with at least one variable cutting tool, unrelated to shape, wherein with the cutting tool first cutting lines are introduced into the material web, resulting in the contour of a blank, of a piece of waste or parts of the contour of a blank and/or a piece of waste in the material web.

In one embodiment, in a further method step, either of the following takes place:
  transportation of the blanks and removal of the pieces of waste from the material web, or
  the removal of the pieces of waste from the web and transportation of the blanks.

According to the German Institute for Standardization DIN 6735, paper is a flat material consisting essentially of fibers of plant origin, which is formed by dewatering on a screen. The result is fiber felt, which is then compressed and dried.

For purposes of this application, the term cardboard is a paper having a basis weight of >150 g/m$^2$.

The term paperboard, which is only used in Germany, describes a paper with a basis weight>600 g/m$^2$. The term paperboard also includes solid paperboard.

Corrugated cardboard is understood to mean a combination of several layers of paper in which one or more layers of corrugated paper are bonded between multiple layers of another paper or cardboard.

Honeycomb-corrugated cardboard is a three-layer composite sandwich construction, which consists of supporting paper webs on the two outer sides and a support core of honeycomb-shaped paper on the inside, which are glued together. According to the invention, honeycomb-corrugated cardboard can also be used as classical corrugated cardboard.

According to the invention, the material web is a corrugated cardboard web. According to the invention, the dimension of the material web is dimensioned such that the width of the web is negligible with respect to the length of the web, i.e. the length-width ratio is very great, different from material sheets. The material web according to the invention is endless since, for example, individual rolls of material e.g. cardboard rolls or paper rolls are connected to each other, for example, glued, and so an uninterrupted, continuous, endless web is formed. In a preferred embodiment, the material web is a corrugated cardboard web which is fed directly from a corrugator into the method according to the invention.

According to the invention, various processing tools can be used which perform a method step partially or completely. In one method step, the material web is correspondingly e.g. cut, scored, embossed or printed. The processing tools are accordingly e.g. cutting tools, scoring tools, embossing tools or printing devices or groups of these tools.

The material web has a top side and a bottom side. The bottom side rests due to gravity on the guide or drive elements. The processing steps of dividing, scoring, embossing etc. are preferably performed from the top side.

Preferably, the shape-unrelated, variable cutting tool is a laser or a plasma cutter, wherein the method is preferably carried out without a shape-related stamping tool.

In the method according to the invention, the material web is preferably provided by means of a feeding device. In one embodiment the feeding takes place in that a material web is placed on a roll-out stand, and when a single material web roll is used this material web is transported directly to the first processing step. When multiple material web rolls are used, the material webs are each placed in a roll-out stand and as soon as a material web approaches the end, another material web is connected by means of an adhesive device or a splicer to the first material web, so that the web feed is not interrupted. Alternatively, the feed can be provided directly from the production method of the material web, for example a corrugator.

The method according to the invention in a preferred embodiment further comprises the steps:
- applying synchronization marks to the material web, wherein the synchronization marks are applied prior to the guidance to at least one cutting tool or by the cutting tool itself,
- detecting the synchronization marks with at least one sensor unit,
- transmitting the data on the position of the synchronization marks from the sensor unit to a control unit,
- controlling the cutting tool by the control unit based on the transmitted data, so that the cutting tool cuts the cutting lines depending on the position of the synchronization marks in the material web.

The synchronization marks are preferably applied by cutting, stamping or printing. Alternatively, they are cut into the material web at the beginning of the cutting process. The synchronization marks must each be placed in the X and Y direction of the material web to achieve accurate alignment of the cutting tool over the material web. The Y direction corresponds to the web running direction, the X direction is transverse to the web running direction. The synchronization marks are preferably applied after the provision of a material web and before the guidance to a cutting tool. Alternatively, the synchronization marks are already applied before the provision of the material web, for example in the pre-printing method. By detection of the synchronization marks, the cutting lines can be applied at the planned locations, even if a large number of different blank geometries are cut in short succession and side by side into the material web.

In the case of corrugated cardboard, the shrinkage behavior of the corrugated cardboard during drying can be additionally measured via the synchronization marks, checked and taken into account for the introduction of the cutting lines into the material web. By applying the synchronization marks, the dimensional stability of the produced corrugated cardboard can be monitored. For this purpose, synchronization marks are applied to the endless corrugated cardboard web and are in each case spaced apart in the x-direction and/or the y-direction, their spacing from one another, i.e. the distance from the mark in the x and/or y direction, being measured. These distances are compared with one another at different times in the course of the method and from this the shrinkage of the corrugated cardboard web during the method according to the invention is calculated. The current shrinkage values of the corrugated cardboard web are compared with historical values (empirical values), which showed the same corrugation type and the same material combination. From this, it can be predicted what further shrinkage of the currently produced and processed corrugated cardboard web is to be expected. Optionally, the measured values of the absolute humidity of the paper rolls to be processed as well as the web humidities of the corrugated cardboard web can also be included in the calculation of the expected web shrinkage at various points in the production method.

Preferably, a plurality of shape-unrelated, variable cutting tools are arranged one behind the other in the running direction of the material web and/or next to one another, i.e. the cutting tools are arranged offset or parallel to one another in the x-direction and y-direction, relative to the x-y plane of the material web. The area of action of the shape-unrelated, variable cutting tools preferably covers the entire x-y plane of the material web. Preferably, the cutting tools are arranged so that the material web is divided into a plurality of possibly overlapping areas of action. A plurality of cutting tools, i.e. a group of cutting tools which cut cutting lines into the material web simultaneously and possibly synchronously within a surface, jointly carry out the method step of cutting. By measuring the synchronization marks, it is possible to realize a synchronization of the collaboratively operating cutting tools. For purposes of this application, "collaborative" is understood to mean that, if a cutting tool has not cut out a blank or a piece of waste completely from the endless material web, the further cutting out from the material web can be continued by one of the adjacent or subsequent cutting tools, with the other cutting tool being oriented towards the applied synchronization mark to continue the machining process accurately.

Alternatively or additionally, a measurement of the web speed is possible in order to achieve a synchronization of the processing steps by the cutting tools and other tools. The processing tools exchange information to have an overview at any time of the current state of production before and after each processing step in order to be able to control the overall manufacturing process in a controlled manner. Alternatively, the control takes place via the control unit.

In one embodiment, first cutting lines are cut into the material web by at least one first cutting tool and second cutting lines are cut into the material web by at least one second cutting tool. Preferably, the second cutting lines are the dividing lines between adjacent blanks or the contours of the blanks.

In one embodiment of the method according to the invention, a planning unit may be operatively coupled to, for example, the sensor unit and/or the control unit. Planning unit may be configured to plan the position of the blanks in the material web in a planning step based on an input. For example, planning unit may be configured to receive and process information from one or more components of the system such as the sensor unit and, based on that information, planning unit may determine the positioning of the one or more blanks. In another example, planning unit may be configured to receive and process information from a user such as via a local or remote user input and, based on that information, planning unit may determine the positioning of the one or more blanks. The planning unit transmits the information to the control unit, which controls the cutting tools and, if necessary, the waste removal elements and transportation devices based on the data of the planning unit. Optionally, the control unit and the planning unit form one unit.

In one embodiment, artificial intelligence is integrated into the planning unit. Optionally, the planning unit is connected to a network such as an internal network or the Internet. The data for the required blanks can be fed into the method via the planning unit. In one embodiment, customers may design an individual blank and send it via the Internet to the planning unit.

The method according to the invention makes it possible to create an individual packaging per customer and order, both in terms of shape and dimensions as well as printing, which is produced directly at the required time, so that no storage costs for packagings arise. The packaging is created individually on demand.

The method according to the invention does not process panels or sheets in a multistage process to produce blanks, but makes these blanks directly from the material web, i.e. the corrugated cardboard web. The machining process is arbitrarily scalable. Thus, the method according to the invention can be adjusted in terms of the required production or packaging quantity by the juxtaposition of additional processing centers in terms of production speed and quantity.

In the method according to the invention, cutting into panels is no longer necessary. The stacking, transporting, possibly storing and picking up of the panels for the next processing step are completely eliminated. The production speed is increased according to the method according to the invention by the elimination of the above-mentioned, non-productive intermediate steps, as well as the more flexible use of the tools by comparison with the conventional method.

By the method according to the invention, a significantly freer arrangement of the packaging blanks on the web is possible. In the conventional further processing methods of the paper or corrugated cardboard processing industry, blanks of the same geometry or the same article are predominantly placed on a sheet during use. In the newly developed method, all available articles that have the same type of material can be combined with one another on the endless material web, which leads to a very high number of possible combinations and thereby drastically reduces the production-related waste.

Moreover, in the method according to the invention, the restriction of the arrangement of the blanks in the web running direction is eliminated. The material web has a large longitudinal extent or is endless, which is an additional advantage over the processing of panels and sheets, and arrangement of blanks on the sheet or the panel is limited by the two dimensions of the sheet or panel surface area.

The freer arrangement of the packaging blanks on the material web leads to a significantly better material utilization, so that less production waste arises. When the method according to the invention is used for the processing of corrugated cardboard webs, also no intermediate storage is necessary in which the corrugated cardboard must first dry.

The method according to the invention allows individually designed, printed or unprinted packagings to be produced. Due to the greater longitudinal extent of the material web in comparison to the production of blanks from panels, a plurality of packagings of most varied dimensions can be realized. In addition, by the cutting with a shape-unrelated cutting tool, a free variation of the blanks without a conversion of a shape-related stamping tool is possible. The method according to the invention makes it possible to produce any number of a particular blank, so both single items and also high volume products are possible.

The method according to the invention is particularly advantageous in the production of corrugated cardboard blanks.

The method according to the invention is fed directly from a conventional corrugated cardboard production plant in one embodiment. The blanks are made in this case immediately following the corrugated cardboard manufacturing process. Preferably, the method according to the invention is fed from a corrugated cardboard, which has no cross cutter, no cutting machine, no scoring machine, no paddle station, no pull-out station and no shelves. If corrugated cardboard blanks are produced according to the method according to the invention, essential assemblies of a conventional corrugated cardboard production plant, i.e. all assemblies of the dryer section, can be completely eliminated since their function is no longer needed or are replaced by other method steps of the method according to the invention.

In the method according to the invention, no waiting times or acclimatization times of the corrugated cardboard are required since the expected shrinkage behavior of the not yet dimensionally stable corrugated cardboard web can be taken into account by the non-forming cutting tool and can be calculated and adjusted in advance by scaling the planned blank. The blank shape is increased during cutting depending on the residual moisture content of the corrugated cardboard, so that the blank receives the desired size after shrinking. The shrinkage of the corrugated cardboard web transversely to the web running direction is significantly greater than the shrinkage in the web running direction. The use of the corrugated cardboard web instead of corrugated cardboard sheets eliminates the restriction of having to arrange the blanks on a limited area.

In one embodiment of the method according to the invention, the material web is additionally printed, especially in a digital printing process. In one embodiment, a digital printing method is integrated into the method according to the invention. The digital printing is done either on the full material web prior to cutting by the shape-unrelated cutting tool or after cutting the first cutting lines at a later time in the course of the method.

The method according to the invention can be carried out with printed or unprinted material webs. Optionally, the finished blank can also be printed in a conventional manner in a separate method step, which is less preferred according to the invention.

In one embodiment of the method according to the invention, the material web is provided in one or more scoring tools with longitudinal scorings and/or transverse scorings, wherein the scorings can take place before or after cutting. In addition or as an alternative, the material web is provided with embossings by one or more embossing tools, the embossings being able to take place before or after the cutting of the material web. The application of the scorings or embossings can either take place over the entire material web prior to cutting or else the individual blank can be scored and/or embossed after cutting.

Furthermore, it is possible to provide the material web in the region of a blank also with a cut which incises the material web not completely but only partially from the upper side of the material to a defined depth in order to reduce the bending stiffness in this area. This area can later be used to bend the blank in a defined manner at this point. The partial incision thus creates the function of a scoring.

In one embodiment, a perforation of the material web in the region of a blank is produced by the cutting tool. In a perforation, the entire material web is completely severed over a defined distance at regular intervals. Between these cuts, the material web remains completely undamaged or is only partially incised from the surface to a defined depth. This also reduces the bending stiffness of the material web to such an extent that it can bend this area in a defined manner after the blank has been completely produced. This corresponds in its function to a perforation or conventional cut scoring.

The blanks are preferably removed by removing the finished blanks from the material web, the removal of the finished blanks being particularly preferably carried out by means of robotic systems or ball-chain conveyors, particularly preferably by means of robotic systems which may be connected to the control unit. Different methods of transport can also be combined.

The transportation of the blanks from the material web is preferably carried out after the removal of the pieces of waste from the blank surface. The transported blank is then free of pieces of waste and only includes the blank itself. In one variant, the waste is removed from the blank but after the transportation of the blanks from the material web.

In the method according to the invention, the removal of the finished blanks from the material web preferably takes place by means of robotic systems. Since the coordinates of the location of the blanks in the material web are known from the layout of the blanks and the processing data of the networked machining centers, the finished blanks are removed from the endless web by the use of suitable robotic systems. For this purpose, the robotic systems are preferably connected to the control unit. For this purpose, for example, pick-and-place robots are used, which are equipped with suitable suction and/or gripper systems. Since the geometry of the finished blanks is known, the suckers and grippers are brought or moved to a suitable position in order to remove the finished blank from the material web in a non-destructive manner and to place it in a desired position outside the material web. To increase the take-off speed of the robotic systems, a plurality of robotic systems can be arranged transversely to the running direction of the material web and/or in the running direction, i.e. cascaded, in order to work collaboratively to remove all blanks from the material web.

In one embodiment, the transportation of the blanks takes place with at least one ball-chain conveyor. First, for this purpose, the material web is guided upwards with the finished blanks by means of a suitable guide roller. So that the finished blanks are not also conveyed away around the guide roller with the rest of the material web, surface-mounted, ball-chain conveyors which are arranged flat and subjected to vacuum, and continue to hold the finished blanks in position as arranged within the web, are located on the bottom of the finished blanks. The ball-chain conveyors can convey the finished blanks flat on the vacuum in the desired x-y direction and thus can carry them off in a controlled manner and, for example, feed them to a downstream process. The surface is spanned by the x-y axes.

In a preferred embodiment, the method according to the invention further comprises the steps of:
  guiding the material web with cutting lines to at least one waste removal element,
  removing pieces of waste from the web with at least one waste removal element.

After removal of the pieces of waste by at least one waste removal element, the material web is particularly preferably transported to at least one second cutting tool, e.g. a second group of cutting tools, and the material web is cut by at least one shape-unrelated, variable cutting tool, wherein the cutting tool inserts second cutting lines into the material web which cut out the contours of a blank or parts of a blank. In this case, further pieces of waste may arise, which must be removed in a further waste removal step. Preferably, all discontinuous pieces of waste are eliminated already in the first waste disposal step.

In one embodiment, the waste removal comprises at least one of the following method steps:
  introducing the material web into a waste removal area which, beneath the material web and in the area of influence of all waste removal elements, has no web guide elements, such as e.g. tubular tables, straps, belts, which can hinder the falling out of the waste material from the material web,
  treating the cut material web with waste removal elements that are installed above the material web and act on the material web from above to remove the waste from the material web in the respective area of influence of the waste removal elements.

Possibly, a large piece of waste is divided into a plurality of smaller pieces of waste to be removed, so that the piece of waste in question, adapted to the mode of operation of the waste removal element, is reliably removed from the material web.

In order to improve the complete removal of the pieces of waste from the material web, the methods listed below can be arranged in cascade one behind the other in the web running direction and combined with each other and arranged in any order and number. Thus, the waste removal process, as well as the other sub-processes of the method according to the invention, is also scalable as desired.

In the conventional production of blanks, the sheets continue to be guided and/or transported by belts or cables during the waste removal process. This is necessary to continue to guide and/or transport the blank in a defined manner while passing through the waste removal station, but hinders the waste removal process and its ejection downwards, as these belts or cables may be below a piece of waste to be removed.

In the method according to the invention, the material web is guided, stabilized and transported in the area of action of the waste removal elements only by free web tension and the web stiffness of the material web. Outside the area of action of the waste removal elements, the material web is again guided and possibly transported in a defined manner by static or dynamic web guiding elements. At this point, by way of example, tubular tables, guide and support strips may be listed as static web guide elements, and straps and belts driven and running at web speed (with and without vacuum) or guide cables may be listed as dynamic web guide elements.

The waste removal elements in one embodiment are surface-acting waste removal elements, preferably compressed air bars, air blades or air strips, brushes with elastic bristles or vacuum belts. A common feature of the surface-acting waste removal methods is that all waste removal elements installed on a traverse act simultaneously and need only be controlled by the control unit in case the action time of these waste removal elements is to be reduced, e.g. to save energy.

If the surface-acting waste removal elements are compressed air nozzles, the waste removal elements are installed on traverses transverse to the direction of travel above the material web and act on the material web from above to remove the waste in the respective area of influence of the waste removal elements from the material web. On a traverse arranged in the web running direction, numerous air nozzles, such as e.g. round or oval nozzle openings, from which compressed air flows out, or an air knife are installed above the material web. Air knives are also called air blades, air cannons, wind knives, curtains, transvectors, airflow boosters, floating knives, air curtains or air swords. The nozzle opening is slit-shaped in these components and runs completely or segmented over the entire web width. Compressed air flows out of these components in a defined manner. On the top side of the completely cut-out piece of waste, the concentrated air blast generates a force F, which pushes the relevant piece of waste downwards out of the material web and thus removes it from the material web.

In one embodiment, the method step of waste removal is carried out by means of rotating brush(es) with elastic bristles. Transversely to the web running direction, a rotating brush, which is equipped with elastic bristles and of which the bristles rotate in the web running direction, is arranged above the material web. The elastic bristles of the roller contact the entire surface of the material web and generates on the surface of the web a force F whose partial component acts in the direction of gravitational force and pushes the pieces of waste located in the area of action of the roller downwards from the endless web.

In one embodiment, the method step of waste removal is carried out by means of a vacuum belt moving at web speed. A vacuum belt, which touches the material web from below and moves at the material web speed in the web running direction, is arranged below the material web. The vacuum belt has a very fine perforation. Below the perforated belt, a vacuum box is installed, so that the material web including the pieces of waste completely cut out in the machining center are sucked in the direction of the rotating vacuum belt. The vacuum belt is deflected in a defined manner by pulleys at the end of the vacuum belt. The vacuum in the vacuum belt is adjusted so that the pieces of waste are led downwards out of the material web by the negative pressure generated, while the web is transported on to the next method step in the web running direction (MD direction). Since there is no negative pressure but the ambient pressure below the guide roller, the pieces of waste fall downwards. For assistance, the pieces of waste can be stripped off and thus removed from the bottom side of the vacuum belt by waste brushes installed transversely to the web direction.

In another embodiment, the waste removal elements are locally acting waste removal elements, preferably air nozzles or movable pushers.

In one embodiment, the method step of waste removal takes place by means of vertically movable pushers (pins) that are arranged vertically above the material web and are individually controllable. On a traverse arranged transversely to the web running direction, a plurality of vertically movable pushers are mounted above and perpendicular to the material web, and are controlled individually by the control unit as soon as a piece of waste to be removed is located within its area of influence. As soon as the relevant pusher receives the signal from the higher-level control, it pushes by a defined distance in the direction of the material web, touches the piece of waste to be removed and then presses the relevant piece of waste, which has been completely cut out of the material web, downwards with a defined force F and thus removes the piece of waste completely and in a defined manner from the material web. Even before the material web has reached the spatial boundary of the relevant piece of waste, the vertically movable pusher returns to its original or rest position above the material web and waits for the next signal for waste removal from the higher-level control.

In one embodiment, the method step of waste removal takes place by means of individually controllable compressed air nozzles. For this purpose, a plurality of air nozzles are installed on a traverse arranged transversely to the web running direction above the material web, and are controlled individually by a controller as soon as a piece of waste to be removed is within the area of influence of the air nozzle. The concentrated air blast generates, on the top side of the piece of waste completely cut out by the cutting tools, a force F which pushes the piece of waste in question downwards out of the material web and thus removes it from the material web.

Alternatively, combinations of different waste removal elements are also used.

If the waste removal does not take place with blanks lying in the material web, in one embodiment the waste is only removed from the finished blank after the blank has been removed from the material web by means of the robotic systems. For this purpose, for example, processing methods are used, which remove the waste from the finished blank by means of elastic brushes, shaking of the blank or selectively controllable air nozzles. The robotic system transports the blanks to the respective waste removal step, where the blanks are freed from the waste.

In a preferred embodiment, the method according to the invention comprises the steps of
 introducing first cutting lines into the material web with at least one first cutting tool, wherein the first cutting lines cut out the contour of a piece of waste and/or parts of the contour of a blank from the material web, without the material web being cut transversely to the running direction,
 transporting the material web with the first cutting lines to at least one waste removal element,
 removing all pieces of waste from the material web with waste removal elements,
 transporting the material web without pieces of waste to at least one second cutting tool,
 introducing second cutting lines into the material web with the second cutting tools, wherein the second cutting lines cut out the contour of a blank or parts of the contour of a blank from the material web,
 transportation of the finished, waste-free blanks and
 if necessary, cutting the remaining material web without blanks with a cross cutter into strips or cutting it up by means of a shredder.

This arrangement of the method steps has the additional advantage that the guidance of the material web during waste removal does not necessarily have to be done with guide cables or belts, since the material web is not completely cut across the running direction or is damaged so far that web guidance or web transport is no longer possible. The material web can be guided through the area of the waste removal by means of a free web tension without lower guide elements in the area of the waste removal elements, provided that the tensile strength of the web does not exceed the current web tensile forces.

In a preferred embodiment, the method according to the invention comprises the steps of
 applying synchronization marks to the material web,
 detecting the synchronization marks with at least one sensor unit,
 transmitting the data on the position of the synchronization marks from the sensor unit to a control unit,
 introducing first cutting lines into the material web with at least one first cutting tool, the control of the cutting tool being carried out by the control unit based on the transmitted data,
 transporting the material web with the first cutting lines to at least one waste removal element,
 removing all pieces of waste from the material web with the waste removal elements,
 transporting the material web without pieces of waste to at least one second cutting tool,
 detecting the synchronization marks with at least one sensor unit,
 transmitting the data on the position of the synchronization marks from the sensor unit to a control unit,
 introducing second cutting lines into the material web by at least one second cutting tool, the control of the cutting tool being carried out by the control unit based on the transmitted data,
 transportation of the finished, waste-free blanks and
 if necessary, cutting the remaining material web without blanks with cross-cutters into strips or cutting it up by means of a shredder.

The printing of the material web and the scoring or embossing of the material web can be carried out additionally and independently of the further method steps. The choice of the necessary method steps depends on the desired product. In the case of unprinted packaging, for example, a scoring must be introduced, but no printing or embossing has to take place. For example, in the case of a display stand, printing must take place but no perforation or embossing.

The blanks produced in the method according to the invention are, for example, blanks for packagings such as shipping cartons, outer packagings, folding boxes or for displays or stands, such as POS displays, counter displays or advertising displays. They are further processed after production in the usual way, for example unfolded and glued.

The invention furthermore relates to a device for producing blanks from corrugated cardboard, comprising
  a feeding device for feeding a corrugated cardboard web,
  a first cutting station having at least one shape-unrelated, variable cutting tool, wherein the shape-unrelated, variable cutting tool is a laser or a plasma cutter and the device preferably has no shape-related stamping tool, wherein the cutting station comprises at least one sensor unit and at least one control unit which is connected to the sensor unit, wherein the sensor unit has a sensor for detecting the position of the synchronization marks and the control unit comprises a control of the cutting tool,
  at least one planning unit which plans the position of the blanks in the material web,
  at least one transport device by which the material web is transported in the device and
  at least one waste removal station that has no web guide elements or web conveyor elements.

The device according to the invention is preferably used for carrying out the method according to the invention.

The device according to the invention may be a modular system of different processing stations. Preferably, each station has its own drive, so that they can be regulated independently of each other. The control of the device is preferably carried out via at least one control unit, preferably electronically or via process computer.

Preferably, a plurality of shape-unrelated, variable cutting tools are arranged in one cutting station, preferably one behind the other in the running direction of the material web and/or side by side, i.e. the cutting tools are each arranged offset or parallel to each other in the x-direction and y-direction, relative to the x-y plane of the material web.

The planning unit transmits the information to the control unit, which controls the cutting tools and, if necessary, the waste removal stations and transportation devices based on the data of the planning unit. Optionally, the control unit and the planning unit form one unit. The planning unit may include artificial intelligence and/or may be connected to the Internet.

In one embodiment, the feeding device is a corrugator to create a corrugated cardboard web. The corrugator no longer requires, in the device according to the invention, cross cutters and cutting machines for cutting in the web running direction, because the blanks are produced directly and without stamping tools, for example by laser cutting devices in the cutting station.

Optionally, in this embodiment, conventional corrugated cardboard production and corrugated cardboard stacking are integrated into the device according to the invention. By an additional deflection of the endless corrugated cardboard sheet over the conventional shelves of the corrugator into the device according to the invention, the material web can be fed to the method according to the invention while the devices for conventional processing of corrugated cardboard are retained. For example, it is possible to first produce a long single web for the digital machining process and then to switch back to the conventional corrugated cardboard manufacturing process. While corrugated cardboards are produced conventionally, the single web can then be further processed according to the invention to provide corrugated cardboard blanks.

The device according to the invention preferably has at least one waste removal station. The waste removal station preferably has surface-acting waste removal elements, more preferably compressed air bars, brushes or vacuum belts, or locally acting waste removal elements, more preferably air nozzles or movable pushers, or a combination of different waste removal elements. The nature of the waste removal elements corresponds to the waste removal elements described in the method according to the invention.

In one embodiment, the device according to the invention has a first cutting station, a first waste removal station, a second cutting station and at least one transportation unit for the blanks. The transportation unit is preferably a robotic system or a ball-chain conveyor, particularly preferably a robotic system which is optionally connected to the control unit.

BRIEF DESCRIPTION OF DRAWINGS

The invention will be explained in more detail with reference to the following figures. In the figures:

FIG. 3 shows a detail of a method according to the invention with the method step "cutting", FIG. 4 shows a detail of a method according to the invention with the method step "removing waste"

DESCRIPTION OF PREFERRED EMBODIMENTS

Figure 2:
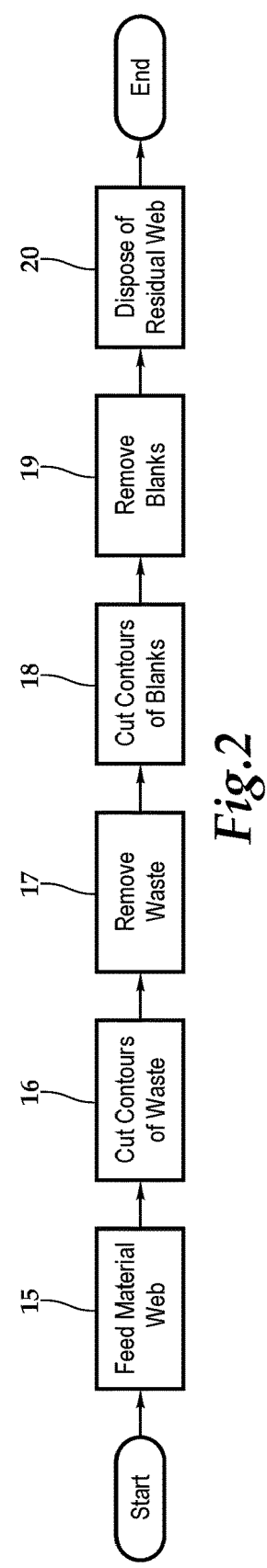
FIG. 2 shows a schematic course of an embodiment of the method according to the invention.

FIG. 2 shows the schematic sequence of an embodiment of the method according to the invention. In a first method step 15, a material web is fed into the process. The material web is a corrugated cardboard web or a honeycomb-corrugated cardboard web. The material web is transported to a group of first cutting tools and in method step 16 the contours of the pieces of waste are cut into the material web. In the following method step 17, the pieces of waste are removed from the material web by one or more waste removal elements. The material web freed from the pieces of waste is transported to a group of second cutting tools, and in step 18 the contour (outer geometry) of the blanks is cut by the second cutting tools into the material web. A robotic system removes the finished blanks from the material web (method step 19) and transports them to a storage location or to a further processing step. The residual web is disposed of in method step 20.

Figure 6:
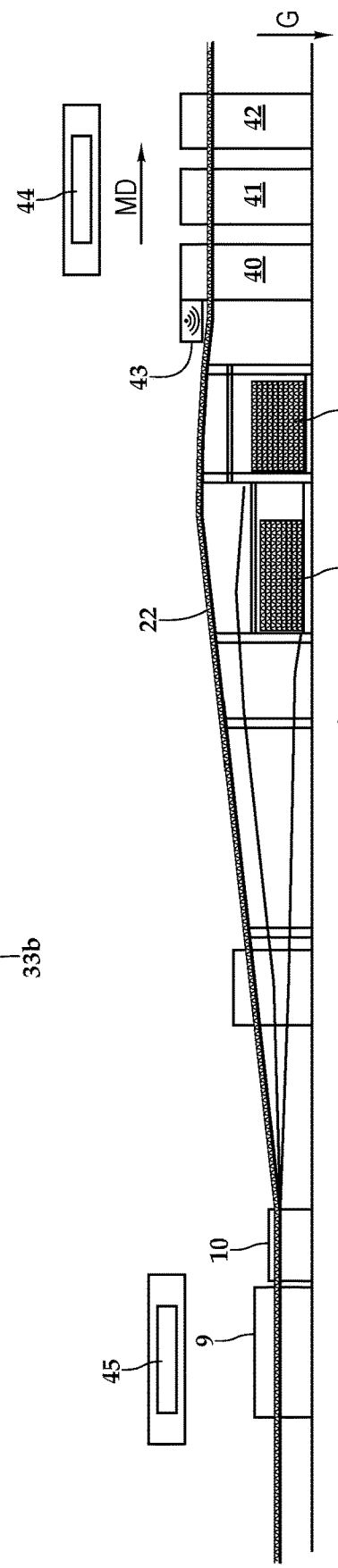

FIG. 3 shows a detail of a method according to the invention. A material web 22 is transported in the web running direction MD, according to the arrow, to a plurality of cutting tools 23a, 23b, 23c. On the web 22 there are a plurality of synchronization marks 27. The cutting tools 23a, 23b and 23c cut cutting lines 24 into the material web 22 within their effective range. In the illustrated case, the cutting lines 24 are the contours of various blanks 21a, 21b and 21c. In FIG. 3, the blanks 21a, 21b and 21c are arranged so that no pieces of waste are formed between the various blanks. A sensor unit 43, as shown in FIG. 6, may be configured to measure the distance between two synchronization marks 27a and 27b. By way of this, the position of the blanks and the width of the material web B can be measured and, if necessary, the shrinkage of the web can be taken into account during the cutting operation.

FIG. 4 shows an embodiment of the method step of removing waste. A material web 22 with cutting lines 24 which correspond to the contour of a piece of waste 26 is transported along in the web running direction MD under two surface-acting waste removal elements 28, 29. Web guiding and/or conveying elements are located below the material web in sub-areas 25a, 25b, 25c. The first waste removal element 28 is a rotating brush having elastic bristles which extends across the entire width B of the material web 22. The brush rotates in the direction of the arrow R and exerts a force on the material web from above. As a result, the pieces of waste fall down from the material web, so that cutouts 30a arise. In the area of action 32a of the waste removal element 28, no web guiding or conveying elements are installed below the material web. In the further course of the web after the sub-area 25b, a second waste removal element 29 acts on the material web. The waste removal element 29 has various air nozzles, from which compressed air is blown onto the material web. Due to the air pressure, the pieces of waste are pressed downwards out of the material web, so that cutouts 30b are formed. In the area of action 32b of the waste removal element 29, no web guiding or conveying elements are likewise installed below the material web. It can be seen that the material web in the region of the waste removal elements is not supported by web guiding or conveying elements, so that the waste removal in the area of action of the waste removal elements is not hindered.

Figure 5:
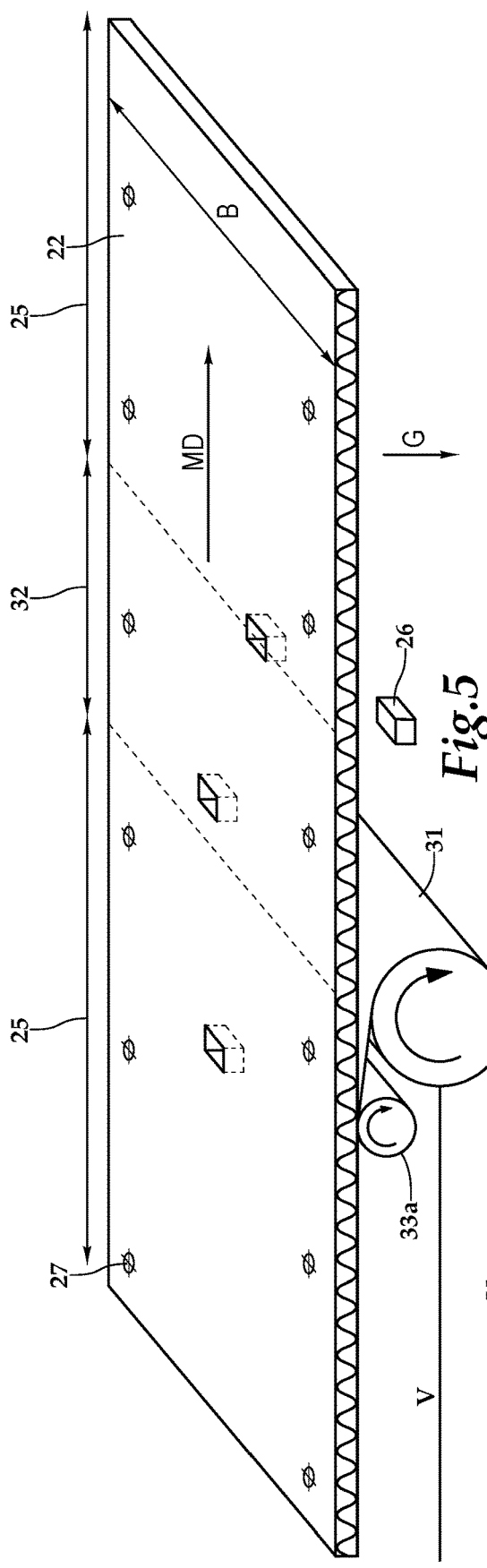
FIG. 5 shows a detail of a method according to the invention with a further embodiment of the method step "removing waste" and FIG. 6 shows a device according to the invention, which is fed by a corrugator.

FIG. 5 shows another embodiment of the method step of removing waste. The waste removal takes place by means of a vacuum belt 31, which moves at web speed in the web running direction MD under the material web 22. The vacuum belt 31 contacts the bottom side of the material web 22. Guiding of the web below the material web takes place by the vacuum belt 31 in the sub-area 25. For this purpose, a defined vacuum is generated below the vacuum belt 31 in the region V. The vacuum belt 31 has a very fine perforation, not shown. The pulleys 33a, 33b at the end of the vacuum belt deflect the belt. The pieces of waste 26 sucked in by the vacuum are led out downwards from the material web 22, while the material web is transported to the next method step. In the area oV no vacuum is generated, only the ambient pressure is applied here. In the area of action 32 no web guiding or conveying elements are installed below the material web. The pieces of waste 26 fall downwards following the gravitational attraction G.

Figure 1:
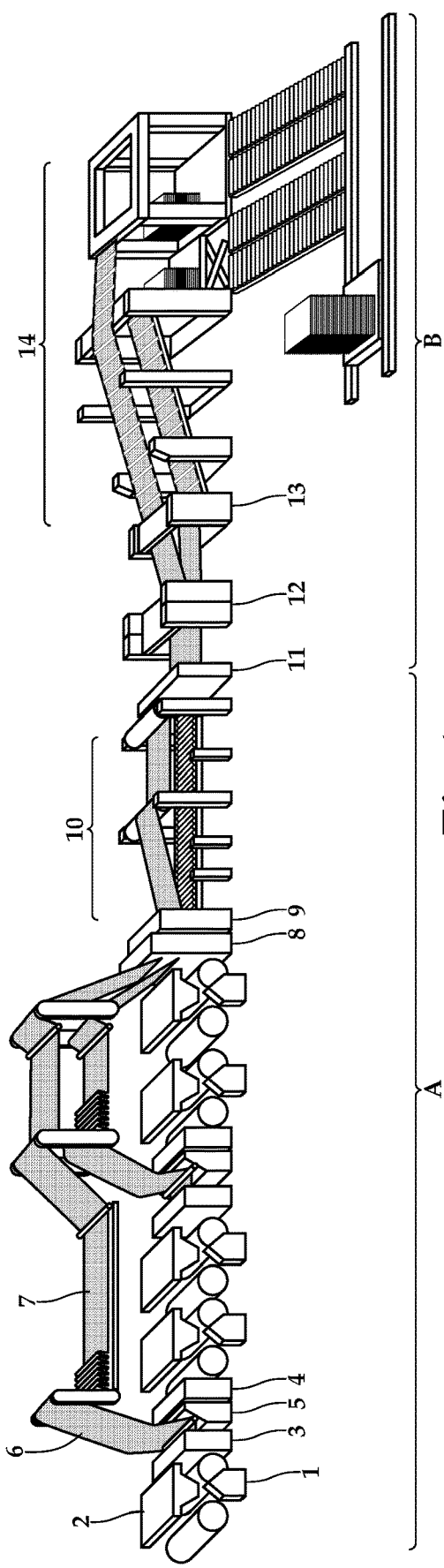
FIG. 1 shows a device for producing corrugated cardboard according to the prior art.

FIG. 6 shows a device according to the invention which is fed from a conventional corrugator with an endless corrugated cardboard web. The construction of the corrugator corresponds to the wet section A according to FIG. 1. The corrugator is adjoined by a cutting station 40, in which a plurality of shape-unrelated cutting tools cut cutting lines in the corrugated cardboard web 22. As shown, the device of FIG. 6 may include a sensor unit 43, a control unit 44, and a planning unit 45. The corrugated cardboard web 22 is further transported into a waste removal station 41 where the pieces of waste are removed. The corrugated cardboard web 22 freed from the pieces of waste is then transported into a 2nd cutting station 42 in which 2nd cutting lines are cut into the corrugated cardboard web. Alternatively, it is possible to cut the corrugated cardboard transversely and to stack the sheets in the shelves 14.

LIST OF REFERENCE SIGNS roll-out stand 1
splicer 2
preheater 3
preparer (rotatable heating cylinder with humidification) 4
corrugation assembly 5
upper transport means 6
bridge 7
preheating cylinder 8
gluing machine 9
heating and tension section 10
short cross cutter 11
scoring and cutting assembly 12
cross cutter 13
shelf 14
blank 21
material web 22
cutting tool 23
cutting line 24
sub-area with web guiding and/or web conveying elements 25
piece of waste 26
synchronization mark 27
roller with rotating, elastic bristles 28
air knife 29
cutout in material web 30
vacuum belt 31
area of action of waste removal element without web guiding or web conveying elements 32
pulley 33
cutting station 40
waste removal station 41
cutting station 42
sensor unit 43
control unit 44
planning unit 45
web running direction MD
width of the material web B
direction of rotation R
gravitational attraction G
area with vacuum V
area without vacuum oV

The invention claimed is:

1. A device for producing blanks from a dimensionally unstable material web, comprising:
   a feeding device for feeding the dimensionally unstable material web, wherein said feeding device is a corrugator for feeding said dimensionally unstable material web;
   a first cutting station configured to receive said dimensionally unstable material web, said first cutting station having plurality of shape-unrelated, variable cutting tools, wherein each shape-unrelated, variable cutting tool is a laser or a plasma cutter and the device has no shape-related stamping tool;
   wherein the first cutting station comprises:
   at least one sensor unit operatively coupled to at least one control unit, the at least one sensor unit having a sensor for detecting distances of synchronization marks in the dimensionally unstable material web, wherein the dimensionally unstable material web is a wet corrugated board subject to shrink when drying such that the distances of the synchronization marks detected by the at least one sensor unit at different times are compared with historical values of a same corrugated board type by the at least one control unit and from the comparison, shrinkage values of the wet corrugated board are predicted, wherein the at least one control unit being a controller that is configured to control each shape-unrelated, variable cutting tool to cut the wet corrugated board based on the predicted shrinkage values in which forming an uninterrupted, continuous, and endless web without an intermediate storage or dryer for waiting the wet corrugated cardboard to dry:

at least one transport device comprises a web storage by which the material web is transported in the feeding device; and at least one waste disposal device having at least one of tubular tables, straps, belts and no web guiding elements.

2. The device according to claim 1, wherein said plurality of shape-unrelated, variable cutting tools are arranged in the first cutting station, the plurality of cutting tools positioned according to at least one of behind another in a running direction of the dimensionally unstable material web, in pairs next to each other, or a combination thereof.

3. The device according to claim 1, wherein the device further comprises a first waste removal station, a second cutting station and at least one transportation unit for the blanks.

4. The device according to claim 3, wherein the at least one transportation unit is a robotic system or a ball-chain conveyor, the robotic system optionally connected to the control unit.

5. The device according to claim 3, wherein the waste removal station has surface-acting waste removal elements, including compressed air beams, brushes or vacuum belts, or locally acting waste removal elements, including air nozzles or movable pushers, or a combination of different waste removal elements.

* * * * *